United States Patent
Wohlgemuth

(10) Patent No.: US 10,122,735 B1
(45) Date of Patent: Nov. 6, 2018

(54) SWITCH HAVING DYNAMIC BYPASS PER FLOW

(75) Inventor: Aron Wohlgemuth, Givat Shmuel (IL)

(73) Assignee: Marvell Israel (M.I.S.L) Ltd., Yokneam (IL)

( * ) Notice: Subject to any disclaimer, the term of this patent is extended or adjusted under 35 U.S.C. 154(b) by 990 days.

(21) Appl. No.: 13/351,442

(22) Filed: Jan. 17, 2012

Related U.S. Application Data

(60) Provisional application No. 61/433,462, filed on Jan. 17, 2011.

(51) Int. Cl.
*H04L 29/06* (2006.01)
*H04L 12/801* (2013.01)

(52) U.S. Cl.
CPC .......... *H04L 63/1408* (2013.01); *H04L 47/12* (2013.01); *H04L 63/20* (2013.01)

(58) Field of Classification Search
CPC ...... H04L 47/12; H04L 63/1408; H04L 63/20
See application file for complete search history.

(56) References Cited

U.S. PATENT DOCUMENTS

| | | | |
|---|---|---|---|
| 6,687,732 B1 * | 2/2004 | Bector | H04L 29/12009 709/200 |
| 6,999,459 B1 * | 2/2006 | Callon et al. | 370/400 |
| 7,126,916 B1 * | 10/2006 | Lauffenburger et al. | 370/235 |
| 8,448,234 B2 | 5/2013 | Mondaeev et al. | |
| 2002/0126677 A1 * | 9/2002 | Hathaway et al. | 370/395.64 |
| 2003/0002503 A1 * | 1/2003 | Brewer | H04L 47/122 370/392 |
| 2004/0215810 A1 * | 10/2004 | Tan | H04L 29/06027 709/232 |
| 2006/0013211 A1 | 1/2006 | Deerman et al. | |
| 2006/0047741 A1 * | 3/2006 | Funada | 709/203 |
| 2006/0098653 A1 * | 5/2006 | Adams | H04L 49/90 370/389 |
| 2006/0120628 A1 * | 6/2006 | Kondo | H04N 19/43 382/307 |
| 2006/0161984 A1 | 7/2006 | Phillips et al. | |
| 2006/0174343 A1 | 8/2006 | Duthie et al. | |
| 2006/0179141 A1 | 8/2006 | John et al. | |
| 2006/0282560 A1 * | 12/2006 | Bell et al. | 710/33 |
| 2007/0039051 A1 | 2/2007 | Duthie et al. | |
| 2007/0047457 A1 | 3/2007 | Harijono et al. | |

(Continued)

OTHER PUBLICATIONS

Final Office Action of U.S. Appl. No. 13/897,820 dated Oct. 31, 2016.

(Continued)

*Primary Examiner* — Khaled Kassim

(57) ABSTRACT

In a method for processing packets in one or more network devices, a first packet is received at the one or more network devices, the first packet being associated with a first bypass indicator. Based at least in part on the first bypass indicator, the first packet, a portion of the first packet, or a packet descriptor associated with the first packet is caused to bypass at least a portion of a first packet processing unit among a plurality of processing units of the one or more network devices, each processing unit being configured to perform a packet processing operation, and not to bypass at least a portion of a second packet processing unit among the plurality of processing units of the one or more network devices.

18 Claims, 7 Drawing Sheets

(56) References Cited

U.S. PATENT DOCUMENTS

| | | | |
|---|---|---|---|
| 2007/0268896 A1* | 11/2007 | Oyama | H04L 12/24 370/389 |
| 2008/0175242 A1* | 7/2008 | Klish | H04L 61/6063 370/392 |
| 2008/0186969 A1* | 8/2008 | Klish | 370/392 |
| 2008/0198785 A1 | 8/2008 | Huang et al. | |
| 2008/0201772 A1* | 8/2008 | Mondaeev | H04L 63/1408 726/13 |
| 2008/0247380 A1* | 10/2008 | LaVigne et al. | 370/351 |
| 2009/0170496 A1* | 7/2009 | Bourque | 455/422.1 |
| 2009/0219939 A1* | 9/2009 | Isosaari | 370/400 |
| 2009/0279438 A1* | 11/2009 | Mackey et al. | 370/241 |
| 2010/0027533 A1* | 2/2010 | Kant et al. | 370/355 |
| 2010/0034084 A1* | 2/2010 | Wang et al. | 370/232 |
| 2010/0238928 A1* | 9/2010 | Prouvost | H04L 29/06027 370/392 |
| 2011/0076985 A1* | 3/2011 | Chami et al. | 455/405 |
| 2012/0117610 A1 | 5/2012 | Pandya | |
| 2012/0177047 A1* | 7/2012 | Roitshtein | H04L 69/22 370/392 |
| 2013/0286840 A1* | 10/2013 | Fan | 370/235 |

OTHER PUBLICATIONS

Non-Final Office Action of U.S. Appl. No. 13/897,820 dated May 8, 2015.
U.S. Appl. No. 13/897,820, filed May 20, 2013.
Non-Final Office Action in U.S. Appl. No. 13/897,820 dated Jun. 6, 2017.

* cited by examiner

SWITCH HAVING DYNAMIC BYPASS PER FLOW

CROSS-REFERENCE TO RELATED APPLICATION

This disclosure claims the benefit of U.S. Provisional Patent Application No. 61/433,462, entitled "Switch Having Dynamic Bypass Per Flow," which was filed on Jan. 17, 2011, the disclosure of which is hereby incorporated by reference herein in its entirety.

FIELD OF TECHNOLOGY

The present disclosure relates generally to communication networks and, more particularly, to packet processing in a network device.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Network devices such as bridges and routers may be implemented by arranging packet processing units in a pipeline architecture. For example, a network device may include a policy unit, a router unit, a policer unit, a bridging unit, etc., implemented as units in a pipeline. The pipeline architecture generally reduces packet transmission delays in network devices that are required to handle packets at a very fast rate.

Each packet processing unit in the pipeline generally increases the latency in the end-to-end processing time of a packet. Some types of communications, such as communications relating to certain financial applications (e.g., sending requests to buy or sell securities), for example, may demand that these transmission latencies be very small. Even small latencies in packet transmissions (e.g., on the order of nanoseconds or milliseconds) can adversely affect a desired outcome, such as buying or selling a security at a target price.

SUMMARY

In one embodiment, a method for processing packets in one or more network devices includes receiving a first packet at the one or more network devices, the first packet being associated with a first bypass indicator. The method also includes, based at least in part on the first bypass indicator, causing the first packet, a portion of the first packet, or a packet descriptor associated with the first packet to bypass at least a portion of a first packet processing unit among a plurality of processing units of the one or more network devices, and not to bypass at least a portion of a second packet processing unit among the plurality of processing units of the one or more network devices. Each processing unit of the plurality of processing units is configured to perform a packet processing operation.

In another embodiment, a network device includes a network interface configured to receive packets transmitted on a network. The network device also includes a plurality of processing units each of which is configured to perform a packet processing operation on received packets and to provide packets, portions of packets, or packet descriptors associated with packets to a next processing unit among the plurality of processing units. The network device further includes a first bypass unit configured to cause, based at least in part on a first bypass indicator associated with a first packet, the first packet, a portion of the first packet, or a packet descriptor associated with the first packet to bypass or not to bypass at least a portion of a first packet processing unit among the plurality of processing units. The network device still further includes a second bypass unit configured to cause, based at least in part on the first bypass indicator, the first packet, the portion of the first packet, or the packet descriptor associated with the first packet to bypass or not to bypass at least a portion of a second packet processing unit among the plurality of processing units.

In another embodiment, a method for processing packets in one or more network devices includes receiving a first packet from a network. The method also includes generating a first packet descriptor based at least in part on information associated with the first packet. The first packet descriptor includes a first bypass indicator. The method further includes causing the first packet, a portion of the first packet, or a packet descriptor associated with the first packet to bypass at least a portion of a first packet processing unit based at least in part on the first bypass indicator. The method still further includes causing the first packet, the portion of the first packet, or the packet descriptor associated with the first packet not to bypass at least a portion of a second packet processing unit based at least in part on the first bypass indicator.

In another embodiment, a network device includes a network interface configured to receive packets from a network. The network device also includes a first packet processing unit among a plurality of processing units. The first packet processing unit is configured to perform a first packet processing operation on received packets. The network device also includes a second packet processing unit among the plurality of processing units. The second packet processing unit is configured to perform a second packet processing operation on the received packets. The network device further includes a descriptor generator unit configured to generate a packet descriptor based at least in part on information associated with a first packet of the received packets. The packet descriptor includes a bypass indicator. The network device still further includes a first bypass unit configured to cause the first packet, a portion of the first packet, or a packet descriptor associated with the first packet to bypass or not to bypass at least a portion of the first packet processing unit based at least in part on the bypass indicator. The network device still further includes a second bypass unit configured to cause the first packet, the portion of the first packet, or the packet descriptor associated with the first packet to bypass or not to bypass at least a portion of the second packet processing unit based at least in part on the bypass indicator.

DETAILED DESCRIPTION

In embodiments described below, one or more network devices (e.g., network switches such as bridges, routers, etc.) include a packet processor along with other components such as network ports. The packet processor includes one or more packet processing units, which in some embodiments are arranged in a pipeline architecture. Within the pipeline, each packet processing unit performs one or more pre-defined processing operations on a packet (or on a data structure corresponding to the packet, such as a packet descriptor) and passes the packet or other data structure to a next unit for additional processing. In one embodiment, packets associated with a particular packet flow dynamically bypass one or more packet processing units within one or more network devices. In another embodiment, packets associated with a particular packet flow dynamically bypass one or more particular portions of one or more packet processing units.

For ease of explanation, the term "packet" may be used herein to refer to any one of the entire packet, a portion of the packet, or a packet descriptor associated with the packet, unless a contrary meaning is clearly indicated. For example, a reference to a packet processing unit receiving or processing "a packet" may refer to any one of (i) the packet processing unit receiving or processing the entire packet, (ii) the packet processing unit receiving or processing only a portion of the packet, or (iii) the packet processing unit receiving or processing a packet descriptor associated with the packet. As another example, a reference to "a packet" bypassing a packet processing unit may refer to any one of (i) the entire packet bypassing the packet processing unit, (ii) only a portion of the packet bypassing the packet processing unit, or (iii) a packet descriptor associated with the packet bypassing the packet processing unit.

Figure 1:
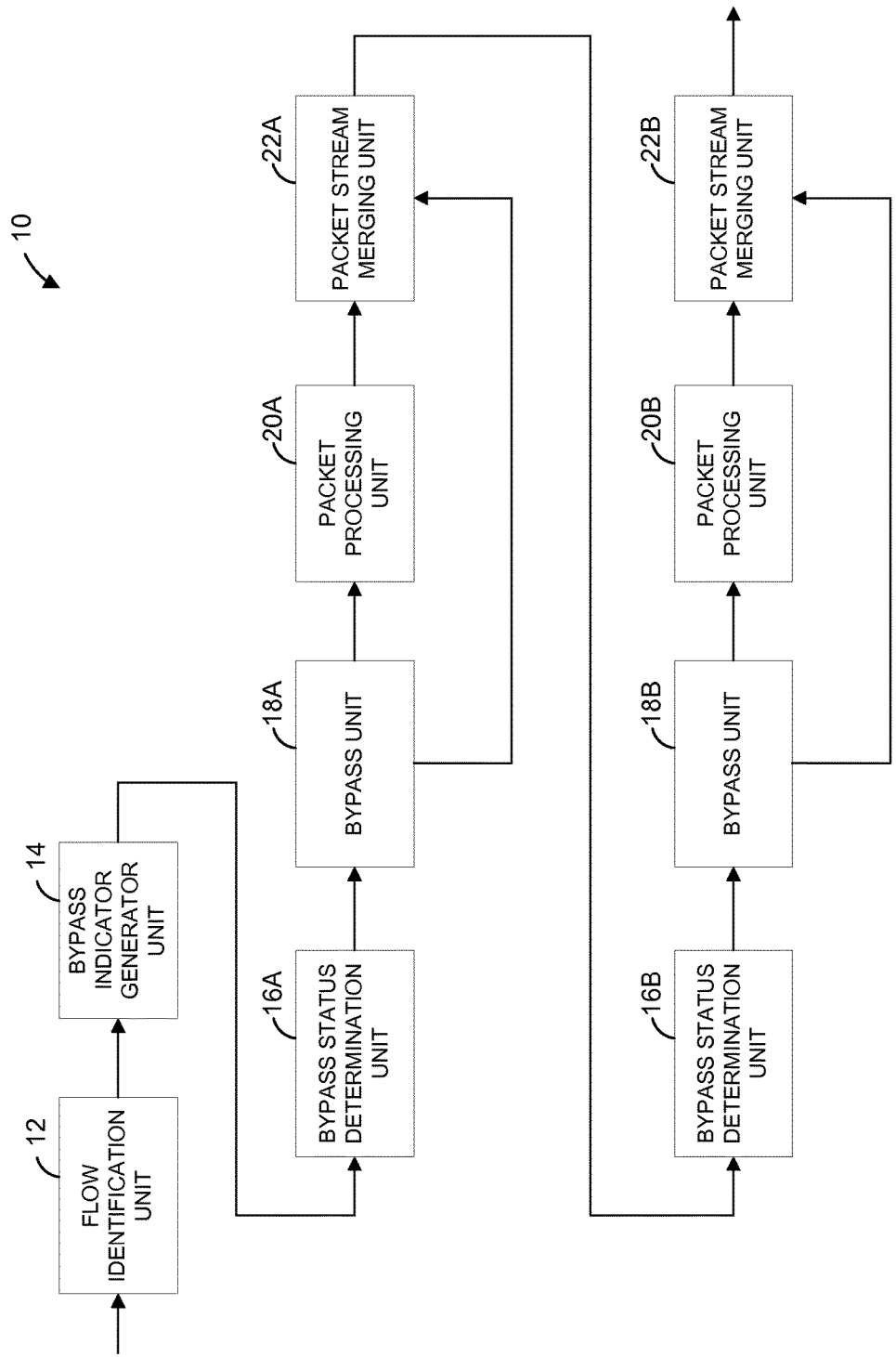
FIG. 1 is a block diagram of an example packet processing system that utilizes dynamic bypass techniques of the present disclosure, according to an embodiment.

FIG. 1 is a block diagram of an example packet processing system 10 that utilizes dynamic bypass techniques of the present disclosure, according to an embodiment. The example system 10 includes a flow identification unit 12, a bypass indicator generator unit 14, bypass status determination units 16, bypass units 18, packet processing units 20, and packet stream merging units 22. Each of the packet processing units 20 performs one or more packet processing operations, such as the primary operations of a network device that includes the packet processing units 20. For example, the packet processing unit 20A is a router unit of a network device and the packet processing unit 20B is a policy unit of the network device (e.g., where both packet processing units 20 are implemented in a pipeline architecture), in an embodiment. As another example, the packet processing unit 20A is a policy unit of a first network device and the packet processing unit 20B is a policy unit of a second network device, in an embodiment.

Generally, the flow identification unit 12 identifies a flow with which a packet is associated, and the bypass indicator generator unit 14 generates a bypass indicator for the packet based on the identified flow. In the example packet processing system 10, each of the packet processing units 20 is associated with a bypass status determination unit 16, a bypass unit 18, and a packet stream merging unit 22. In one embodiment, the bypass status determination units 16 and bypass units 18 are separate as seen in FIG. 1. In other embodiments, the bypass status determination units 16 and bypass units 18 are combined in a single unit.

Generally, each bypass status determination unit 16 determines a bypass status (e.g., bypass or no bypass) based on the bypass indicator generated by the bypass indicator generator unit 14, and each bypass unit 18 causes a packet to bypass or not to bypass the respective packet processing unit 20 based on the determined bypass status. Each packet stream merging unit 22 merges packet streams passing through (not bypassing) the respective packet processing unit 20 with packet streams not passing through (bypassing) the respective packet processing unit 20.

In an embodiment, the units 12, 14, 16, 18, 20, and 22 are implemented in a pipeline architecture of a network device, where each unit performs one or more processing operations before passing a packet to a next unit in the pipeline. In a pipeline architecture, the units 12, 14, 16, 18, 20, and 22 are able to simultaneously perform processing operations on packets within a stream of packets, without having to wait for a first packet to be processed by all units before beginning to process a second packet. Within the pipeline, however, each processing unit or stage that a packet passes through introduces an inherent latency of at least one clock cycle. For example, when a packet passes through every stage in a network device, the number of clock cycles of latency at least equals (and likely exceeds) the number of stages in the network device.

In some embodiments, each unit in the example packet processing system 10 is included in a network device, such as a router, bridge, or other network switch. In other embodiments, various units or portions of units in the example system 10 are implemented in different network devices that are communicatively coupled together. For example, the flow identification unit 12 and bypass indicator generator unit 14 are included in a first network device, and the bypass status determination units 16, bypass units 18, packet processing units 20, and packet stream merging units 22 are included in a second network device communicatively coupled to the first network device, in an embodiment. As another example, the flow identification unit 12, bypass indicator generator unit 14, bypass status determination unit 16A, bypass unit 18A, packet processing unit 20A, and packet stream merging unit 22A are included in a first network device, and the bypass status determination unit 16B, bypass unit 18B, packet processing unit 20B, and packet stream merging unit 22B are included in a second network device communicatively coupled to the first network device, in an embodiment.

The various units of the example packet processing system 10 are now described in more detail. The flow identification unit 12 receives each packet, and identifies a flow with which each packet is associated. A packet "flow" can be defined based on one or more attributes shared by each packet included in the flow. For example, a packet flow can be defined to include packets having identical (or, in some embodiments, sufficiently similar) packet header information with respect to one or more attributes such as protocol type, IP version, virtual LAN (VLAN), source or destination MAC address, source or destination IP address, Layer-4 ports (e.g., source or destination ports for transmission control protocol (TCP), user datagram protocol (UDP), or stream control transmission protocol (SCTP)), multiprotocol label switching (MPLS) labels, physical source and destination ports of the router/switch, virtual source and destination ports of the router/switch, etc. In some embodiments, the packet is received by the flow identification unit 12 from a network (e.g., via a port or network interface), or from a previous unit within a pipeline of a device that includes the flow identification unit 12.

In some embodiments, the flow identification unit 12 includes, or is coupled to, a content addressable memory, such as a TCAM, also referred to herein as an addressable memory. The addressable memory relates information about packets (e.g., information in a packet header data field) to particular flow classifications, in an embodiment. In some of these embodiments, the flow identification unit 12 uses the information about the received packet as a key to the addressable memory. In one embodiment, flow classification is based on a multi-field lookup of packet attributes, such as any of the packet attributes listed above (protocol type, IP version, VLAN, etc.), for example. In this manner, the flow identification unit 12 identifies a particular flow classification that corresponds to the packet information, thereby identifying the flow with which a received packet is associated, in an embodiment. In one embodiment, at least one flow entry in the addressable memory corresponds to the detection of a new, unrecognized flow.

The bypass indicator generator unit 14 is communicatively coupled to the output of the flow identification unit 12. In some embodiments, the bypass indicator generator unit 14 receives information representing the flow identified by the flow identification unit 12 (e.g., receives a flow classification). In one embodiment, the bypass indicator generator unit 14 is a descriptor generator unit that generates a packet descriptor for each received packet based on the identified flow (e.g., based on the flow classification) of each packet, where the bypass indicator is included in the generated descriptor. In another embodiment, the bypass indicator generator unit 14 adds one or more new fields to an existing packet descriptor based on the identified flow of each packet, where the bypass indicator is included in the new field(s). In yet another embodiment, the bypass indicator generator unit 14 modifies one or more existing data fields of an existing packet descriptor, where the bypass indicator is included in the modified field(s). In still other embodiments, the bypass indicator generator unit 14 generates a bypass indicator that is not included in a packet descriptor.

Each bypass indicator generated by the bypass indicator generator unit 14 indicates whether the packet corresponding to the flow identified by the flow identification unit 12 should bypass one or more packet processing units, and/or whether the packet corresponding to the identified flow should bypass one or more portions of one or more packet processing units, according to various embodiments. In an embodiment, the bypass indicator generator unit 14 generates a bypass indicator for each received packet. For example, a first bypass indicator is generated for a first packet, and a second bypass indicator is generated for a second packet, in an embodiment.

In some embodiments where the bypass indicator generator unit 14 is a descriptor generator unit, the generated descriptor also includes some information from the packet (e.g., some or all of the header information of the packet) and/or other types of information (e.g., an indicator of where in a memory the packet is stored). Moreover, in some embodiments, the bypass indicator is not reserved for use solely as an indicator of bypass status. For example, information in the bypass indicator is also used by other processing units in a pipeline to determine how to process the packet, in an embodiment. As a more specific example, information in the bypass indicator is also used by a policy unit to determine which rules apply to the packet, in an embodiment. As another example, information in the bypass indicator is also used by a router unit or a bridging unit to route or forward a packet, in an embodiment.

In some embodiments, the bypass indicator generator unit 14 includes, or is coupled to, an addressable memory, such as a TCAM. In an embodiment, the addressable memory is the same as the addressable memory used by the flow identification unit 12. In another embodiment, the addressable memory is different than the addressable memory used by the flow identification unit 12. The addressable memory relates each of a plurality of flow classifications to bypass information, in an embodiment. The bypass indicator generator unit 14 uses the flow classification received from the flow identification unit 12 as a key to the addressable memory, in an embodiment. In this manner, bypass indicator generator unit 14 determines which bypass information corresponds to the flow classification in the addressable memory, and generates an appropriate bypass indicator, in an embodiment. In one embodiment, at least one entry in the addressable memory corresponds to a flow classification for a new, unrecognized flow, and relates the new flow to default bypass information. For example, an entry corresponding to a new flow relates the new flow to bypass information representing that no packet processing units are to be bypassed or partially bypassed, in an embodiment.

The first bypass status determination unit 16A is communicatively coupled to the output of the bypass indicator generator unit 14. The first bypass status determination unit 16A determines a first bypass status of a received packet, where the first bypass status indicates whether the first packet processing unit 20A should be bypassed. In an embodiment, the first bypass status determination unit 16A determines a first bypass status based on the bypass indicator generated by the bypass indicator generator unit 14. For example, in one embodiment where the bypass indicator generator unit 14 is a descriptor generator unit, the bypass status determination unit 16A includes hardware logic that determines a bypass status based on the value of a bypass indicator in a packet descriptor generated by the descriptor generator unit.

The first bypass unit 18A is communicatively coupled to the output of the first bypass status determination unit 16A. The first bypass unit 18A causes a received packet to bypass or not to bypass the first packet processing unit 20A based at least in part on the first bypass status determined by the first bypass status determination unit 16A. For example, in an embodiment, the first bypass unit 18A includes logic that provides the packet to the first packet processing unit 20A (i.e., so that the packet is processed by the first packet processing unit 20A), or to a path parallel to the first packet processing unit 20A (i.e., so that the packet is not processed by the first packet processing unit 20A), based on the determined bypass status. In an embodiment, the path parallel to the first packet processing unit 20A includes a buffer (e.g., a first-in-first-out (FIFO) buffer) (not shown in FIG. 1), where the buffer stores each packet that bypasses the first packet processing unit 18A. Temporary stress caused by packets bypassing the first packet processing unit 20A, which may lead to buffer drops and lost packets, can be mitigated by increasing the depth of the buffer.

The first packet processing unit 20A is communicatively coupled to a first output of the first bypass unit 18A. The first packet processing unit 20A performs at least a first packet processing operation on received packets. For example, in an embodiment, the first packet processing unit 20A is an ingress policy unit that determines one or more rules or actions that should be applied to a packet in an ingress pipeline based on a determined flow of the packet (e.g., by utilizing flow identifier information from flow identification unit 12 or a different flow identifier and one or more lookup stages). As another example, in an embodiment, the first packet processing unit 20A is a policer unit that performs rate limiting and makes flow traffic measurements. These and other example packet processing units are discussed below with reference to FIG. 2.

A first input of the first packet stream merging unit 22A is communicatively coupled to the output of the first packet processing unit 20A, and a second input of the first packet stream merging unit 22A is communicatively coupled to a second output of the first bypass unit 18A. The first packet stream merging unit 22A merges packets from a packet stream passing through the first packet processing unit 20A with packets from a packet stream from the second output of the first bypass unit 18A (i.e., with packets passing through the path parallel to the first packet processing unit 20A). In an embodiment, the first packet stream merging unit 22A merges the two packet streams according to a suitable arbitration technique (e.g., standard or weighted round-robin, standard or weighted fair queuing, etc.). In some embodiments, parameters for the arbitration technique are configurable in the field and can be programmed in the field by an individual configuring a network device that includes the packet stream merging unit 22A. For example, the weightings of weighted round robin arbitration are programmable (and reprogrammable), in an embodiment.

A second bypass status determination unit 16B is communicatively coupled to the output of the first packet stream merging unit 22A. The second bypass status determination unit 16B determines a second bypass status of the received packet, where the second bypass status indicates whether the second packet processing unit 20B should be bypassed. In an embodiment, the second bypass status is determined based on the same bypass indicator that is used by the first bypass status determination unit 16A to determine the first bypass status. As used herein, however, the term "bypass indicator" may refer to information in more than a single location. In one embodiment, for example, a bypass indicator includes both a first field of a packet descriptor used to determine whether a first packet processing unit is to be bypassed, and a second field of the packet descriptor used to determine whether a second packet processing unit is to be bypassed. In an embodiment, the second bypass status determination unit 16B is similar to the first bypass status determination unit 16A.

The second bypass unit 18B is communicatively coupled to the output of the second bypass status determination unit 16B. The second bypass unit 18B causes the received packet to bypass or not to bypass the second packet processing unit 20B based at least in part on the second bypass status determined by the second bypass status determination unit 16B. In an embodiment, the second bypass unit 18B is similar to the first bypass unit 18A.

The second packet processing unit 20B is communicatively coupled to a first output of the second bypass unit 18B. The second packet processing unit 20B performs at least a second packet processing operation on received packets. For example, in an embodiment, the second packet processing unit 20B is a router unit for performing Layer-3 routing functions. As another example, in an embodiment, the second packet processing unit 20B is a bridging unit for performing Layer-2 bridging functions. As yet another example, in an embodiment, the second packet processing unit 20B is an egress policy unit that determines one or more rules or actions that should be applied to a packet in an egress pipeline based on a determined flow of the packet (e.g., by utilizing flow identifier information from flow identification unit 12 or another flow identifier and one or more lookup stages). These and other example packet processing units are discussed below with reference to FIG. 2. Together, the packet processing units 20A and 20B form at least a part of a packet processing pipeline of a single network device, in an embodiment. In another embodiment, the packet processing units 20A and 20B are included in different network devices that are communicatively coupled together.

A first input of the second packet stream merging unit 22B is communicatively coupled to the output of the second packet processing unit 20B, and a second input of the second packet stream merging unit 22B is communicatively coupled to a second output of the second bypass unit 18B. The second packet stream merging unit 22B merges packets from a stream passing through the second packet processing unit 20B with packets from a stream from the second output of the second bypass unit 18B (i.e., with packets passing through the path parallel to the second packet processing unit 20B). In an embodiment, the second packet stream merging unit 22B is similar to the first packet stream merging unit 22A.

In some embodiments, the output of the second packet stream merging unit 22B is coupled to another packet processing unit (not shown), or to a bypass status determination unit (not shown) associated with another packet processing unit. In other embodiments, the output of the second packet stream merging unit 22B is communicatively coupled to a network or a network interface.

In operation, for a given packet, the example packet processing system 10 bypasses or does not bypass each of the packet processing units 20 based on the flow associated with the packet (i.e., the flow identified by the flow identification unit 12). For example, in one scenario, a first packet bypasses the first packet processing unit 20A but does not bypass the second packet processing unit 20B (or vice versa). In this example scenario, the first bypass status determination unit 16A determines a first bypass status based at least in part on a first bypass indicator generated by the bypass indicator generator unit 14, and the first bypass unit 18A causes the first packet to bypass the first packet processing unit 20A based at least in part on the first bypass status. Also in this example scenario, the second bypass status determination unit 16B determines a second bypass status based at least in part on the first bypass indicator, and the second bypass unit 18B causes the first packet not to bypass the second packet processing unit 20A based at least in part on the second bypass status.

In other example scenarios, a first packet bypasses both, or neither of, the first packet processing unit 20A and the second packet processing unit 20B. In another example scenario, a first packet (associated with a first flow identified by the flow identification unit 12) bypasses the first packet processing unit 20A, while a second packet (associated with a different, second flow identified by the flow identification unit 12) does not bypass the first packet processing unit 20A (or vice versa). In this latter example scenario, the bypass indicator generator unit 14 generates a first bypass indicator associated with the first packet and a second bypass indicator associated with the second packet.

In one embodiment, the first bypass status determination unit 16A and/or a portion of the first bypass unit 18A are included in an access stage within the first packet processing unit 20A, and the second bypass status determination unit 16B and/or a portion of the second bypass unit 18B are included in an access stage within the second packet processing unit 20B, where each access stage (e.g., input circuitry) controls access to the remainder of the respective packet processing unit or portion thereof. In light of this possibility, and for ease of explanation, references herein to packets bypassing a "packet processing unit" include packets passing through an access stage of the packet processing unit before bypassing the remainder of the packet processing unit. Similarly, references herein to packets bypassing a "portion of a packet processing unit" include packets passing through an access stage of the portion of the packet processing unit before bypassing the remainder of the portion of the packet processing unit.

The various units seen in FIG. 1 need not be distinct from all other units. In one embodiment, for example, the first bypass status determination unit 16A is a part of the first bypass unit 18A (i.e., the first bypass unit 18A causes the packet to bypass or not bypass the first packet processing unit 20A in part by determining a first bypass status), and the second bypass status determination unit 16B is a part of the second bypass unit 18B. In another embodiment, the first packet stream merging unit 22A is a part of the first packet processing unit 20A, and the second packet stream merging unit 22B is a part of the second packet processing unit 20B. In yet another embodiment, the first packet stream merging unit 22A is a part of the first bypass unit 18A and the second packet stream merging unit 22B is a part of the second bypass unit 18B.

In another embodiment, the example system 10 includes a single unit that combines the flow identification unit 12 and the bypass indicator generator unit 14. Moreover, in some embodiments, the functions of the flow identification unit 12 and the bypass indicator generator unit 14 are collapsed into a single function. For instance, in one embodiment, a combined unit uses one or more data fields of a header of a packet being processed as a key to an addressable memory (e.g., a TCAM) to directly identify which bypass information corresponds to the header information, without identifying a flow as a distinct, intermediate step.

In another embodiment, the example system 10 includes a flow identification unit 12 and/or bypass indicator generator unit 14 that are included in a unit that also performs other operations. For instance, in one embodiment, the flow identification unit 12 and the bypass indicator generator unit 14 are included in a unit that additionally identifies a different flow associated with a received packet, and additionally generates packet descriptor fields that are unrelated to bypass indication.

In another embodiment, the example system 10 does not include a flow identification unit 12 and/or bypass indicator generator unit 14 that are distinct from the bypass status determination unit 16. For instance, in an embodiment, each of the bypass status determination units 16 directly determines whether the respective packet processing unit 20 should be bypassed based on packet information (e.g., one or more data fields in a packet header) that indicates a flow with which the packet being processed is associated. In this embodiment, there is no need to first generate a bypass indicator based on a previous identification of flow. In other words, information within the received packet itself (e.g, a packet header) serves as the bypass indicator, in this embodiment, without having to generate a bypass indicator based on the packet information.

In another embodiment, the example system 10 does not include a bypass status determination unit 16. For instance, in an embodiment, each of the bypass units 18 directly determines, based on a bypass indicator, whether a received packet should bypass the corresponding packet processing unit 20, without relying on a previous bypass status determination.

In another embodiment, the example system 10 includes a different number of packet processing units 20, bypass status determination units 16, bypass units 18, and/or packet stream merging units 22. For instance, the example system 10 does not include the second bypass status determination unit 16B, the second bypass unit 18B, the second packet processing unit 20B, and the second packet stream merging unit 22B, in an embodiment. In another embodiment, the example system 10 includes the second packet processing unit 20B but does not include the second bypass status determination unit 16B, the second bypass unit 18B, and the second packet stream merging unit 22B. In yet another embodiment, the example system 10 includes at least a third packet processing unit (e.g., between the first packet processing unit 20A and the second packet processing unit 20B, or after the second packet processing unit 20B, etc.), with or without a corresponding bypass status determination unit, bypass unit, and/or packet stream merging unit.

Each of the units illustrated in the example system 10 is implemented in hardware, in a processor that executes firmware and/or software instructions, or a combination thereof. In some embodiments, all of the units illustrated in the example system 10 are implemented in whole or in part in hardware, and all units process the packet substantially at wire speed. For example, each of the units is implemented in an application specific integrated circuit (ASIC), in an embodiment. In other embodiments, a different type of integrated circuit is used such as a programmable logic device (PLD), a field programmable gate array (FPGA), a programmable logic array (PLA), a custom integrated circuit, etc. In some embodiments, the units of the example system 10 are implemented on multiple different integrated circuits that are coupled together.

Figure 2:
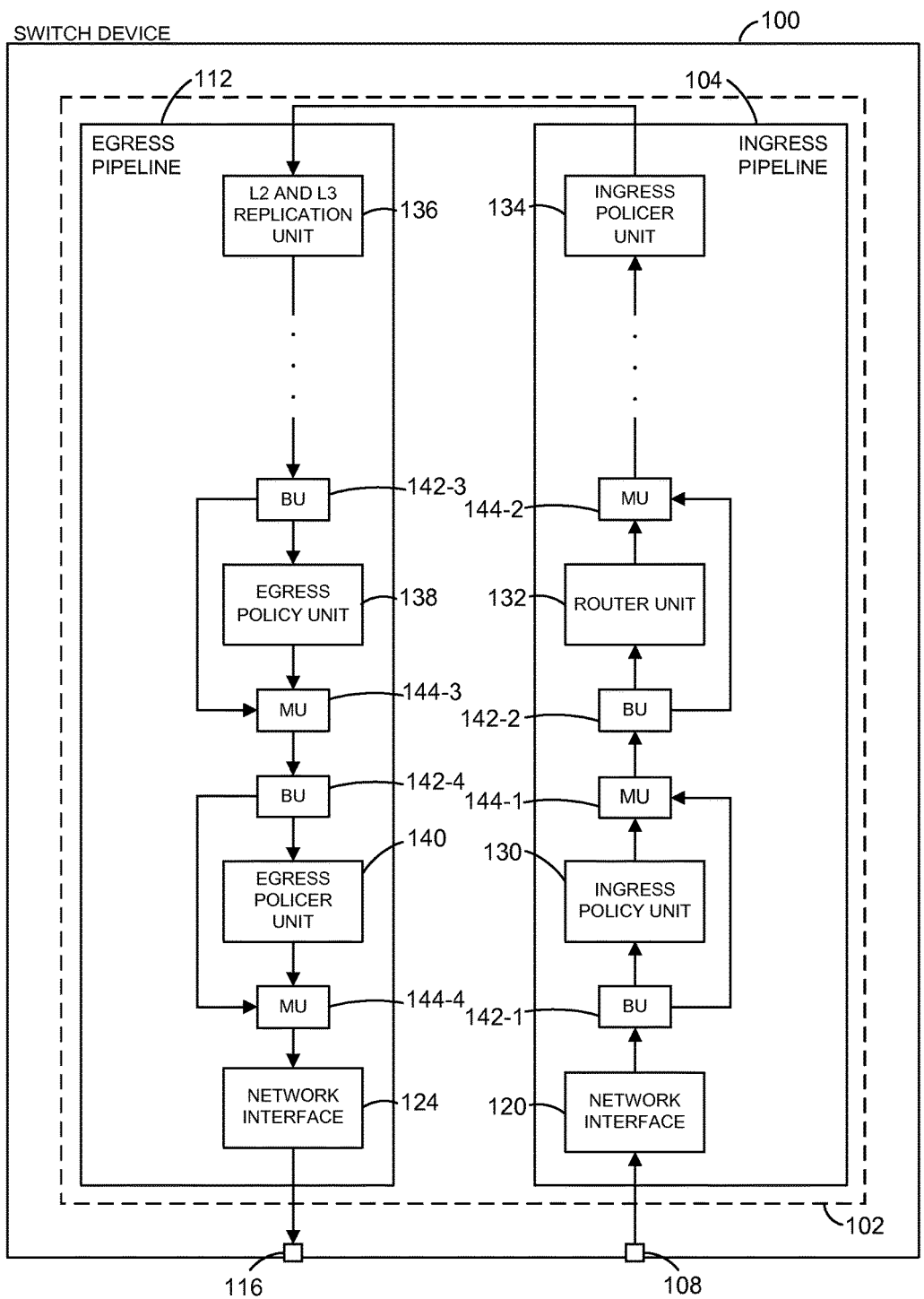
FIG. 2 is a block diagram of an example switch device in which all or a part of the example system of FIG. 1 is implemented, according to an embodiment.

FIG. 2 is a block diagram of an example switch device 100 in which all or a part of the system 10 of FIG. 1 is implemented, according to an embodiment. The switch device 100 includes a packet processing pipeline 102 that includes a packet ingress (i.e., in the example switch device 100, an ingress pipeline 104) coupled to one or more input circuits 108, and a packet egress (i.e., in the example switch device 100, an egress pipeline 112) coupled to one or more output circuits 116. The input circuits 108 and output circuits 116 are coupled to one or more networks such as a wide area network (WAN) and/or a local area network (LAN), for example. The one or more input circuits 108 allow the ingress pipeline 104 to receive a plurality of packet flows, where each flow includes one or more packets. Similarly, the one or more output circuits 116 are for transmitting the plurality of packet flows. The ingress pipeline 104 and the egress pipeline 112 generally transfer packets of data from the input circuits 108 to appropriate ones of the output circuits 116. The one or more input circuits 108 correspond to one or more input ports of the switch device 100, and the one or more output circuits 116 correspond to one or more output ports of the switch device 100.

In the example switch device 100 of FIG. 2, the ingress pipeline 104 includes a network interface unit 120 coupled to the input circuits 108, via which the ingress pipeline 104 receives packets from a network. The network interface unit 120 generally interfaces the ingress pipeline 104 with one or more physical ingress ports of the switch device 100. In an embodiment, the switch device 100 includes a plurality of physical ingress ports and a plurality of respective network interface units 120. In another embodiment, one network interface unit 120 interfaces the ingress pipeline 104 with a plurality of physical ingress ports of the switch device 100.

Similarly, a network interface unit 124 is coupled to the output circuits 116. The network interface unit 124 generally interfaces the egress pipeline 112 with one or more physical egress ports of the switch device 100. In an embodiment, the switch device 100 includes a plurality of physical egress ports and a plurality of respective network interface units 124. In another embodiment, one network interface unit 124 interfaces the egress pipeline 112 with a plurality of physical egress ports of the switch device 100.

As shown in FIG. 2, each of the ingress pipeline 104 and the egress pipeline 112 of the example switch device 100 includes a plurality of packet processing units coupled in series. Generally, each unit in a pipeline processes a packet and then passes the packet to the next unit in the pipeline. The last unit of the ingress pipeline 104 passes the packet to the first unit of the egress pipeline 112 (e.g., directly, or via a fabric interface). In some embodiments, some or all of the units of the ingress pipeline 104 and/or the egress pipeline 112 include, or otherwise are associated with, corresponding memories. A packet received by a unit is stored in the memory associated with the unit, in an embodiment.

In particular, the example switch device 100 includes, among other units, an ingress policy unit 130, a router unit 132, an ingress policer unit 134, a Layer-2 and Layer-3 replication unit 136, an egress policy unit 138, and an egress policer unit 140, with additional packet processing units (not shown) being represented by the dotted lines in the path of the ingress pipeline 104 and egress pipeline 112.

The ingress policy unit 130 generally determines a packet flow to which a received packet belongs (or determines that the packet belongs to a currently unknown flow), attaches to the packet a flow identifier that indicates a flow to which the packet is determined to belong (or indicating that the packet belongs to an unknown flow), and determines one or more rules or actions that should be applied to the packet based on the determined flow. To this end, the ingress policy unit 130 includes one or more lookup stages that access an external memory, in an embodiment. In some embodiments, the ingress policy unit 130 is coupled to a TCAM or other suitable memory (not shown) that is accessed for one or more of the lookup stages. In one embodiment, the ingress policy unit 130 uses data fields of the header of the packet being processed as a key to a TCAM. An entry in the TCAM corresponds to an existing flow and indicates a particular rule or set of one or more actions to be performed (with regard to flow measurement, for example), in an embodiment. In some embodiments, at least one entry in the TCAM corresponds to detection of a new (unknown) flow and indicates a particular rule or set of one or more actions to be performed when a new flow is detected.

The router unit 132 generally uses Layer-3 Internet Protocol (IP) information to forward a received IP packet to one or more ports that communicate with a network. The router unit 132 includes, or is coupled to, a routing information database (not shown) that includes Layer-3 information (e.g. destination IP address) corresponding to network locations where IP packets should be forwarded. In some embodiments, if a router unit (e.g., router unit 132) or other forwarding unit of a network device is bypassed, at least one other, non-bypassed packet processing unit (e.g., a bridging unit or Layer-4 unit) within the switch device 100 makes a forwarding decision. For example, a packet processing unit can be bypassed only if the unit is not necessary to make a forwarding decision, in an embodiment.

The ingress policer unit 134 generally performs rate limiting, makes flow traffic measurements, and stores flow measurement information in flow entries. The ingress policer unit 134 takes different actions for different flows, in an embodiment. To this end, the ingress policer unit 134 utilizes flow classification information from the ingress policy unit 130 in determining what actions should be taken, in an embodiment.

The Layer-2 and Layer-3 replication unit 136 is generally responsible for local broadcast/multicast replication.

The egress policy unit 138 is similar to the ingress policy unit 130, in an embodiment. For example, the egress policy unit 138 determines a flow to which an egressing packet belongs (or whether the packet belongs to a currently unknown flow), attaches to the packet information (e.g., a flow classification) indicating the flow to which the packet is determined to belong (or indicating that the packet belongs to an unknown flow), and determines one or more rules or actions that should be applied to the packet based on the determined flow, in an embodiment. To this end, the egress policy unit 138 includes one or more lookup stages that access an external memory, in an embodiment. In some embodiments, the egress policy unit 138 is coupled to a TCAM or other suitable memory (not shown) that is accessed for one or more of the lookup stages. In one embodiment, the egress policy unit 138 uses data fields of the header of the packet being processed as a key to a TCAM, in a manner similar to the ingress policy unit 130.

The egress policer unit 138 generally performs operations similar to the operations of the ingress policer unit 134. In some embodiments, the egress policer unit 138 utilizes flow classification information from the ingress policy unit 130 and/or the egress policy unit 138 in determining what actions should be taken.

Certain packet processing units within the example switch device 100 are associated with a corresponding bypass unit (BU) 142 and merging unit (MU) 144 to implement the disclosed dynamic bypassing techniques. In some embodiments, each BU 142 causes the received packet to bypass or not to bypass the corresponding packet processing unit based on a bypass status, where the bypass status is based directly or indirectly on an identified flow associated with the packet. In some of these embodiments, each BU 142 implements the functionality of the bypass unit 18A of FIG. 1. In other embodiments, each BU 142 both determines a bypass status associated with the corresponding packet processing unit and causes the received packet to bypass or not to bypass the corresponding packet processing unit based on the determined bypass status. In some of these latter embodiments, each BU 142 implements the functionality of both the bypass status determination unit 16A and the bypass unit 18A of FIG. 1.

In some embodiments, each MU 144 merges packets from a stream passing through the corresponding packet processing unit with packets from a stream from the corresponding BU 142. For example, the MU 144-1 merges packets from a stream passing through the ingress policy unit 130 with packets from a stream from the BU 142-1 that bypasses the ingress policy unit 130, in an embodiment. As another example, the MU 144-2 merges packets from a stream passing through the router unit 132 with packets from a stream from the BU 142-2 that bypasses the router unit 132, in an embodiment. In some embodiments, each MU 144 implements the functionality of the packet stream merging unit 22A of FIG. 1.

In an embodiment, each bypass path between a BU 142 and a corresponding MU 144 includes one or more buffers (not shown), such as one or more FIFO buffers. In some embodiments, the buffers are included in the corresponding BUs 142 and/or MUs 144. In other embodiments, the buffers are coupled between (but separate from) the corresponding BUs 142 and MUs 144.

In the example switch device 100, only the ingress policy unit 130, router unit 132, egress policy unit 138, and egress policer unit 140 are seen as being associated with a corresponding BU 142 and MU 144, while the ingress policer unit 134 and Layer-2 and Layer-3 replication unit 136 are seen as not being associated with any BU or MU. In other embodiments, however, different packet processing units include or do not include a BU and MU for dynamic bypassing of the units. For example, in an embodiment, the ingress policy unit 130 does not include the BU 142-1 or the MU 144-1. As another example, in an embodiment, the ingress policer unit 134 is associated with a corresponding BU and MU.

In some embodiments, the example switch device 100 includes more, fewer, and/or different types of packet processing units than seen in FIG. 2, and/or includes packet processing units with different external access stages. For example, in various embodiments, the switch device 100 also or instead includes a Layer-2 processing unit, a processing unit that accesses an external MAC table, a VLAN tag processing unit, etc. As another example, the switch device 100 does not include the egress policer unit 140 (or the BU 142-4 and MU 144-4), in an embodiment.

Further, while FIG. 2 illustrates an embodiment in which each BU 142 and MU 144 is arranged to dynamically bypass an entire packet processing unit (e.g., the entire router unit 132, or the entire egress policer unit 140, etc.), other embodiments are arranged to dynamically bypass only one or more portions of the processing within a packet processing unit. For example, in one embodiment, the MU 144-1 immediately follows a first lookup stage (of multiple lookup stages) included in the ingress policy unit 130, such that a packet can bypass or not bypass the first lookup stage (but not successive lookup stages) depending on a bypass status associated with the packet. Moreover, other embodiments are arranged to dynamically bypass more than one packet processing unit using a single BU 142 and a single MU 144. For example, the bypass path from BU 142-1 is coupled to MU 144-2 (e.g., via a FIFO buffer), in an embodiment, such that a packet bypasses or does not bypass both the ingress policy unit 130 and the router unit 132 depending on a single bypass status associated with the packet (in which case the MU 144-1 and the BU 142-2 are omitted).

In some embodiments, one or more of the packet processing units illustrated in the switch device 100 of FIG. 2, and/or additional units not shown in FIG. 2, implement the functionality of the flow identification unit 12 and/or bypass indicator generator unit 14 of FIG. 1. For example, the ingress policy unit 130 performs the functions of the flow identification unit 12 and bypass indicator generator unit 14, in some embodiments. In some of these embodiments, the ingress policy unit 130 cannot be dynamically bypassed (e.g., BU 142-1 and MU 144-1 are omitted).

In an embodiment, some or all of the pipeline 102 is implemented on a single ASIC. In other embodiments, other types of integrated circuits are used such as an FPGA, a PLA, a custom integrated circuit, etc. In some embodiments, the ingress pipeline 104 and the egress pipeline 112, or various modules within the pipelines 104, 112, are implemented on multiple different integrated circuits that are coupled together.

Although dynamic bypass techniques have been described above with reference to the example switch device 100, in other embodiments these techniques are utilized in a different type of network device, such as a network bridge, a gateway, a wireless access point, etc. Moreover, other embodiments implement the disclosed dynamic bypass techniques with respect to packet processing units included in more than one network device.

Figure 3:
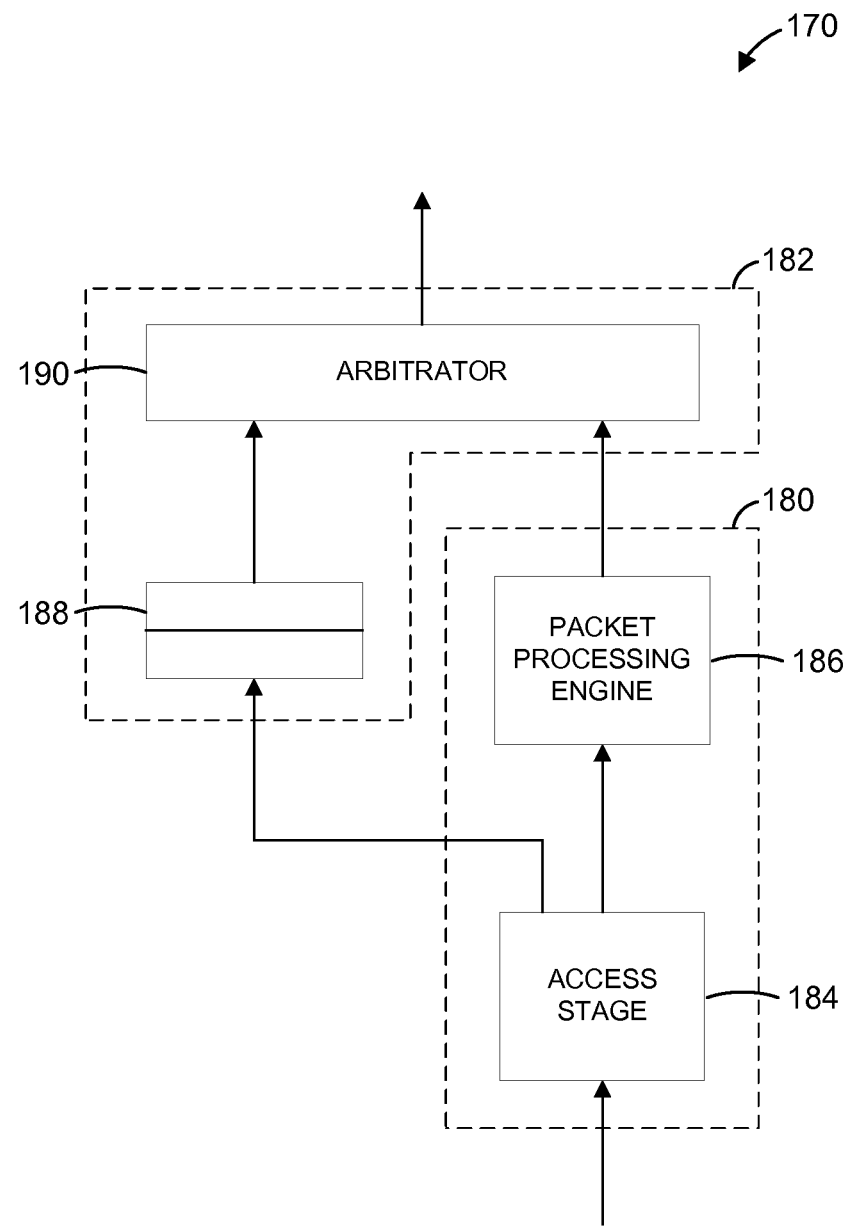
FIG. 3 is a block diagram of example units within a network device for dynamically bypassing a packet processing unit, according to an embodiment.

FIG. 3 is a block diagram of example units 170 within a network device for dynamically bypassing at least a portion of a packet processing unit 180, according to an embodiment. The example units 170 include a bypass merging unit 182 that is associated with the packet processing unit 180. In an embodiment, the packet processing unit 180 is one of the units in the ingress pipeline 104 or egress pipeline 112 of the switch device 100 of FIG. 2 (e.g., the ingress policy unit 130, router unit 132, egress policy unit 138, or egress policer unit 140), and the bypass merging unit 182 implements the functionality of the corresponding MU 144 of FIG. 2. In an embodiment, the packet processing unit 180 is similar to the first packet processing unit 20A of FIG. 1.

The packet processing unit 180 of FIG. 3 includes an access stage 184 and a packet processing engine 186, and the bypass merging unit 182 includes a buffer 188 and an arbitrator 190. The access stage 184 of the packet processing unit 180 determines a bypass status of the packet processing engine 186 (i.e., determines whether an incoming packet should bypass the packet processing engine 186), and directs the packet accordingly. In an embodiment, the access stage 184 implements the functionality of the first bypass status determination unit 16A and first bypass unit 18A of FIG. 1. In various embodiments, the access stage 184 includes logic that determines whether a previously generated bypass indicator (e.g., in a packet descriptor) corresponds to a bypass of the packet processing unit 180 (i.e., in the embodiment of FIG. 3, to a bypass of the packet processing engine 186). In some of these embodiments, the access stage 184 combines the functionality of a bypass status determination unit 16 and bypass unit 18 of FIG. 1. In other embodiments, the access stage 184 directly determines whether an incoming packet should bypass the packet processing unit 180 by determining whether received packet information (e.g., in a particular field of a packet header) corresponds to a bypass (i.e., the received packet information itself acts as the bypass indicator). In some of these embodiments, the access stage 184 is similar to the bypass unit 18 of FIG. 1, where the separate flow identification unit 12, bypass indicator generator 14, and bypass status determination unit 16 of FIG. 1 are all omitted. In one embodiment, the access stage 184 includes or is coupled to an addressable memory (e.g., a TCAM) with entries that relate a bypass indicator (e.g., information in a packet descriptor or packet header) to a corresponding bypass status.

When the access stage 184 determines that a bypass indicator does not correspond to a bypass of the packet processing unit 180, the packet is provided to the packet processing engine 186, in an embodiment. Generally, the packet processing engine 186 performs a primary function of the packet processing unit 180. For example, in an embodiment where the packet processing unit 180 is an ingress or egress policer unit (e.g., similar to the ingress or egress policer unit 130 or 140 of FIG. 2), the packet processing engine 186 performs rate limiting, makes flow traffic measurements, stores flow measurement information in flow entries, etc.

When the access stage 184 determines that the bypass indicator does correspond to a bypass of the packet processing unit 180, the access stage 184 provides the packet to the bypass merging unit 182, in an embodiment. In particular, the packet is provided to the buffer 188 (e.g., a FIFO buffer) of the bypass merging unit 182, in an embodiment. The buffer 188 stores each packet provided to the bypass merging unit 182, in an embodiment.

The arbitrator 190 merges the packet stream flowing through the packet processing unit 180 with the packet stream flowing through the bypass merging unit 182. The arbitrator 190 uses a suitable arbitration technique (e.g., standard or weighted round robin, standard or weighted fair queuing, etc.) to combine the packet streams. In an embodiment, the arbitrator 190 is similar to the first packet stream merging unit 22A of FIG. 1. In an embodiment, the buffer 188 stores each packet provided to the bypass merging unit 182 until the arbitrator 190 is able to merge the packet into the packet stream that is output by the packet processing unit 180.

In an embodiment, the output of the arbitrator 190 is coupled to a successive packet processing unit (e.g., an access stage of a successive packet processing unit) in a pipeline of packet processing units. In another embodiment, the output of the arbitrator 190 is coupled to a port or a network interface.

In one alternative embodiment, the access stage 184 is external to the packet processing unit 180 (i.e., is a part of the bypass merging unit 182, or is separate from both the packet processing unit 180 and the bypass merging unit 182). For example, a unit external to the packet processing unit 180 includes both the access stage 184 and the bypass merging unit 182, in an embodiment, such that every packet directed to the packet processing unit 180 must first pass through the external unit to determine whether the packet should bypass or not bypass the packet processing unit 180. In another alternative embodiment, the arbitrator 190 is external to the bypass merging unit 182 (i.e., is a part of the packet processing unit 180, or is separate from both the packet processing unit 180 and the bypass merging unit 182).

Figure 4:
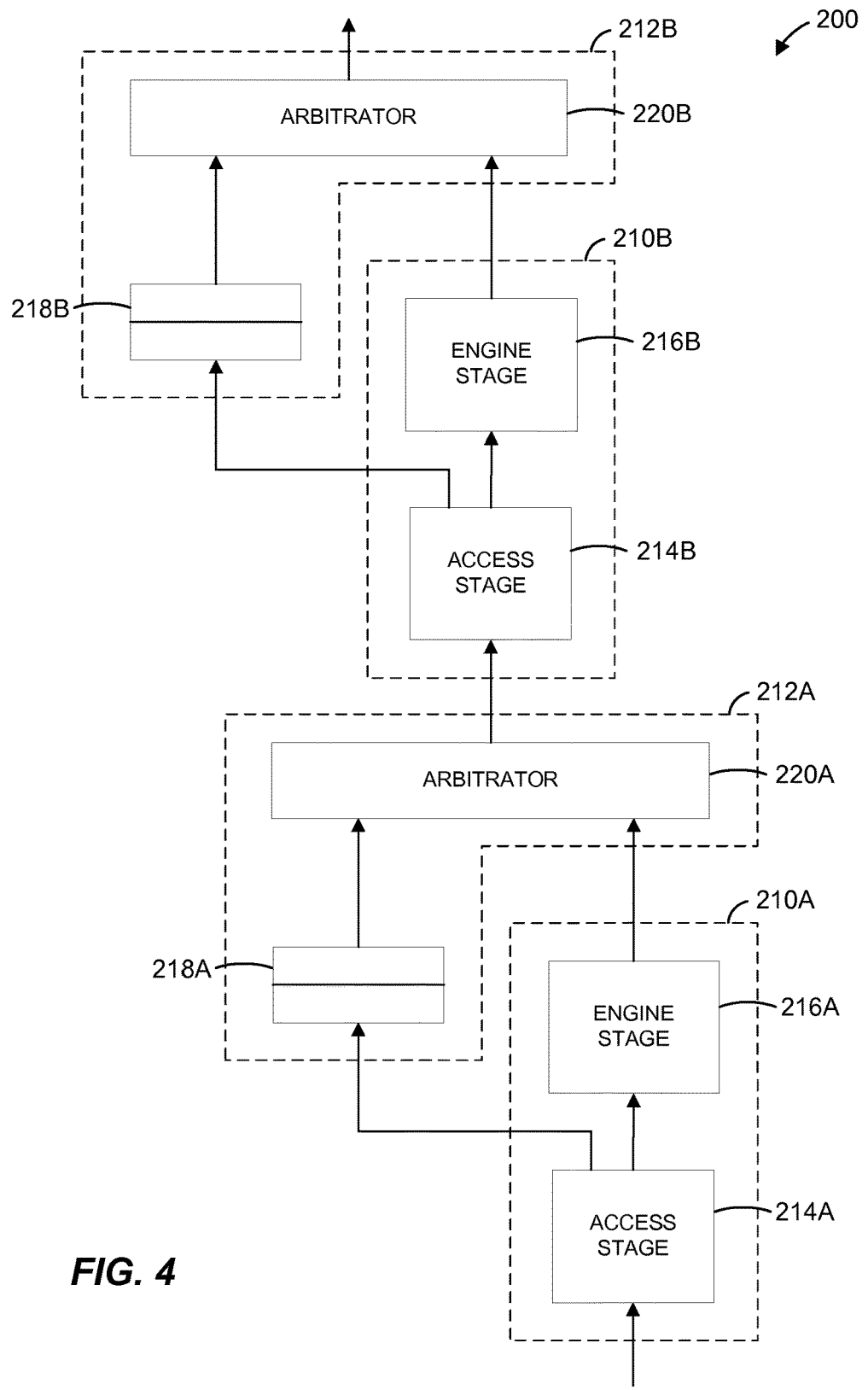
FIG. 4 is a block diagram of example units within a packet processing unit for dynamically bypassing one or more portions of the packet processing unit, according to an embodiment.

The dynamic bypass techniques described herein may also be individually applied to one or more portions within a single packet processing unit. FIG. 4 is a block diagram of example units 200 within a packet processing unit for dynamically bypassing one or more portions 210 of the packet processing unit, according to an embodiment. The example units 200 include bypass merging units 212 associated with the portions 210 of the packet processing unit. In an embodiment, the portions 210 of the packet processing unit are included in a single packet processing unit that is one of the packet processing units in the ingress pipeline 104 or egress pipeline 112 of the switch device 100 of FIG. 2 (e.g., the ingress policy unit 130, router unit 132, egress policy unit 138, etc.). As an example, the first portion 210A of the packet processing unit performs a first set of one or more flow measurement functions in a first portion of an egress policer unit (such as the egress policer unit 138 of FIG. 2), and the second portion 210B of the packet processing unit performs a second, different set of one or more flow measurement functions in a second portion of the egress policer unit, in an embodiment.

The first portion 210A of the packet processing unit that includes the example units 200 includes a first access stage 214A and a first engine stage 216A. The first access stage 214A determines whether an incoming packet should bypass the first engine stage 216A. The first access stage 214A is similar to the access stage 184 of FIG. 3, in an embodiment. When the first access stage 214A determines that a bypass indicator (e.g., information in a packet descriptor) does not correspond to a bypass of the first portion 210A of the packet processing unit, the packet is provided to the first engine stage 216A, in an embodiment. Generally, the first engine stage 216A performs the primary function of the first portion 210A of the packet processing unit. For example, in an embodiment where the first portion 210A of the packet processing unit performs a first set of one or more flow measurements of an ingress policer unit, the first engine stage 216A performs the corresponding flow measurement function(s).

When the first access stage 214A determines that the bypass indicator does correspond to a bypass of the first portion 210A of the packet processing unit, the packet is provided to a first bypass merging unit 212A rather than the first engine stage 216A, in an embodiment. In particular, the packet is provided to a first buffer 218A (e.g., a FIFO buffer) in the first bypass merging unit 212A, in an embodiment. The first buffer 218A stores each packet provided to the first bypass merging unit 212A, and provides the packet to a first arbitrator 220A that merges the packet stream flowing through the first portion 210A of the packet processing unit with the packet stream flowing through the first bypass merging unit 212A, in an embodiment. The first buffer 218A and first arbitrator 220A are similar to the buffer 188 and arbitrator 190 of FIG. 3, in an embodiment.

A second portion 210B of the packet processing unit is coupled to the output of the first arbitrator 220A, in an embodiment. The second portion 210B of the packet processing unit that includes the example units 200 includes a second access stage 214B and a second engine stage 216B. The second access stage 214B determines whether an incoming packet should bypass the second engine stage 216B. The second access stage 214B is similar to the access stage 184 of FIG. 3, in an embodiment. When the second access stage 214B determines that a bypass indicator (e.g., the same bypass indicator used to determine the bypass status of the first portion 210A of the packet processing unit) does not correspond to a bypass of the second portion 210B of the packet processing unit, the packet is provided to the second engine stage 216B, in an embodiment. Generally, the second engine stage 216B performs a primary function of the second portion 210B of the packet processing unit. For example, in an embodiment where the second portion 210B of the packet processing unit performs a second set of one or more flow measurements of an ingress policer unit, the second engine stage 216E performs the corresponding flow measurement function(s).

When the second access stage 214B determines that the bypass indicator does correspond to a bypass of the second portion 210B of the packet processing unit, the packet is provided to a second bypass merging unit 212B rather than the second engine stage 216B, in an embodiment. In particular, the packet is provided to a second buffer 218B (e.g., a FIFO buffer) in the second bypass merging unit 212B, in an embodiment. The second buffer 218B stores each packet provided to the second bypass merging unit 212B and passes the packet to a second arbitrator 220B that merges the packet stream flowing through the second portion 210B of the packet processing unit with the packet stream flowing through the second bypass merging unit 212B, in an embodiment. The second buffer 218A and second arbitrator 220B are similar to the buffer 188 and arbitrator 190 of FIG. 3, in an embodiment.

In some embodiments, the output of the arbitrator 220B is coupled to a successive portion of the same packet processing unit (e.g., to an access stage of a successive portion of the packet processing unit). In other embodiments, the output of the arbitrator 220B is coupled to a successive packet processing unit (e.g., to an access stage of a successive packet processing unit) that is different than the packet processing unit that includes the packet processing unit portions 210A and 210B. In still other embodiments, the output of the arbitrator 220B is coupled to a port or a network interface.

In one alternative embodiment, the access stages 214A and 214B are external to the packet processing unit portions 210A and 210B (i.e., are parts of the bypass merging units 212A and 212B, or are separate from both the packet processing unit portions 210A and 210B and the bypass merging units 212A and 212B), respectively. For example, units external to the portions 210 of the packet processing unit include both the respective access stages 214 and the respective bypass merging unit 212, in an embodiment, such that every packet directed to a portion 210 must first pass through the respective external unit to determine whether the packet should bypass or not bypass the portion 210. In another alternative embodiment, the arbitrators 220A and 220B are external to the bypass merging units 212A and 212B (i.e., are parts of the packet processing unit portions 210A and 210B, or are separate from both the packet processing unit portions 210A and 210B and the bypass merging units 212A and 212B).

In another alternative embodiment, the packet processing unit that includes the portions 210 also includes one or more other portions of the packet processing unit, each additional portion being similar to the packet processing unit portions 210 (with or without additional corresponding bypass merging units similar to the bypass merging units 212). For example, a third portion of the packet processing unit that does not include a bypass merging unit (and, in an embodiment, does not include an access stage) is coupled between the bypass merging unit 212A and the portion 210B of the packet processing unit, in an embodiment. In another alternative embodiment, a single bypass merging unit 212 corresponds to (i.e., provides a bypass path for) at least both the portion 210A and the portion 210B of the packet processing unit, but does not provide a bypass path for additional portions (not shown in FIG. 4) of the packet processing unit.

Figure 5:
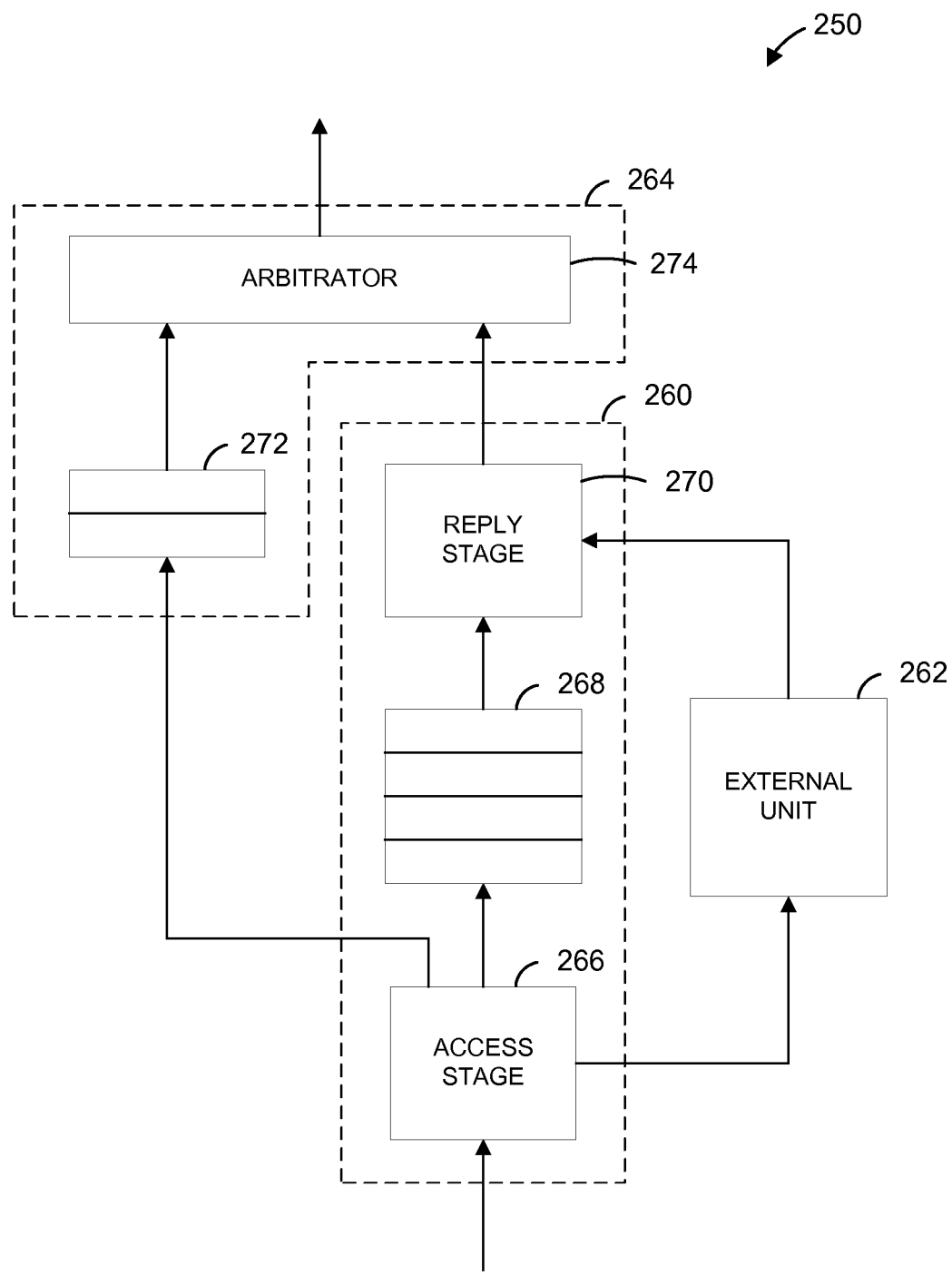
FIG. 5 is a block diagram of example units within a packet processing unit for dynamically bypassing an external access, according to an embodiment.

FIG. 5 is a block diagram of example units 250 within a packet processing unit for dynamically bypassing an external access, according to an embodiment. A portion 260 of the packet processing unit accesses an external unit 262, and a bypass merging unit 264 is associated with the portion 260. In an embodiment, the portion 260 of the packet processing unit is a part of a packet processing unit that is one of the packet processing units in the ingress pipeline 104 or egress pipeline 112 of the switch device 100 of FIG. 2 (e.g., the ingress policy unit 130, router unit 132, egress policer unit 138, egress policy unit 140, etc.). For example, the portion 260 of the packet processing unit is a lookup stage in an ingress policy unit (such as the ingress policy unit 130 of FIG. 2), and the external unit 262 includes an addressable memory (e.g., a TCAM), in an embodiment. In some embodiments, the external unit 262 includes a packet processing unit (or one or more portions thereof) that is different than the packet processing unit that includes the portion 260.

The access stage 266 determines whether an incoming packet should bypass the portion 260 of the packet processing unit. The access stage 266 is similar to the access stage 184 of FIG. 3, in an embodiment. When the access stage 266 determines that a bypass indicator (e.g., information in a packet descriptor) does not correspond to a bypass of the portion 260 of the packet processing unit, the access stage 266 accesses the external unit 262, in an embodiment. The access stage 266 may access the external unit 262 in various ways according to various embodiments. In some embodiments, the access stage 266 accesses the external unit 262 by providing a copy of the packet or packet descriptor being processed to the external unit 262. For example, in one embodiment where the external unit 262 includes an addressable memory such as a dynamic random-access memory (DRAM) or TCAM, the access stage 266 sends one or more packet descriptor fields to the external unit 262, wherein the one or more packet descriptor fields are utilized as, or are utilized to generate, a key to perform a lookup in the memory. In another embodiment, the access stage 266 accesses the external unit 262 by sending a query to the external unit 262.

The access stage 266 also provides the packet received by the portion 260 of the packet processing unit to a buffer 268 (e.g., a FIFO buffer) of the portion 260, in an embodiment. In some embodiments, the buffer 268 stores the packet while the external unit 262 is being accessed. For example, the buffer 268 stores the packet while a value is being looked up in a memory of the external unit 262, in an embodiment. As another example, the buffer 268 stores the packet while a processing engine of the external unit 262 operates on a copy of the packet, in an embodiment.

A reply stage 270 is coupled to an output of the buffer 268 and an output of the external unit 262. In some embodiments, the reply stage 270 retrieves the packet from the buffer 268 when receiving a response from the external unit 262. For example, the reply stage 270 retrieves the packet from the buffer 268 in response to receiving a value from a lookup table of the external unit 262, in an embodiment. As another example, the reply stage 270 retrieves the packet from the buffer 268 in response to receiving information from the external unit 262 that the external unit 262 generated by processing a copy of the packet. In some embodiments, the reply stage 270 (or another stage, not shown in FIG. 5) utilizes the information received from the external unit 262 to modify a portion of the packet retrieved from the buffer 268.

When the access stage 266 determines that the bypass indicator does correspond to a bypass of the portion 260 of the packet processing unit, the packet is provided to the bypass merging unit 264 rather than the buffer 268, and the access stage 266 does not access the external unit 262, in an embodiment. In particular, the packet is provided to the buffer 272 (e.g., a FIFO buffer) of the bypass merging unit 264, in an embodiment. In some embodiments, the buffer 272 stores each packet provided to the bypass merging unit 264. An arbitrator 274 merges the packet stream flowing through the portion 260 of the packet processing unit with the packet stream flowing through the bypass merging unit 264. The buffer 272 and arbitrator 274 are similar to the buffer 188 and arbitrator 190 of FIG. 3, in an embodiment In one alternative embodiment, the access stage 266 is external to the packet processing unit that includes the portion 260 (i.e., is a part of the bypass merging unit 264, or is separate from both the packet processing unit and the bypass merging unit 264). For example, a unit external to the packet processing unit that includes the portion 260 includes both the access stage 266 and the bypass merging unit 264, in an embodiment, such that every packet directed to the portion 260 must first pass through the external unit to determine whether the packet should bypass or not bypass the portion 260. In another alternative embodiment, the arbitrator 274 is external to the bypass merging unit 264 (i.e., is a part of the packet processing unit that includes the portion 260, or is separate from both the packet processing unit and the bypass merging unit 264). In yet another alternative embodiment, one or more external units in addition to external unit 262 are accessed when the access stage 266 determines that a packet should not bypass the portion 260 of the packet processing unit. In still another alternative embodiment, the packet processing unit that includes the portion 260 also includes one or more other portions, where the additional portion(s) of the packet processing unit do or do not have corresponding external units similar to the external unit 262, and do or do not have corresponding bypass merging units similar to bypass merging units 264.

Figure 6:
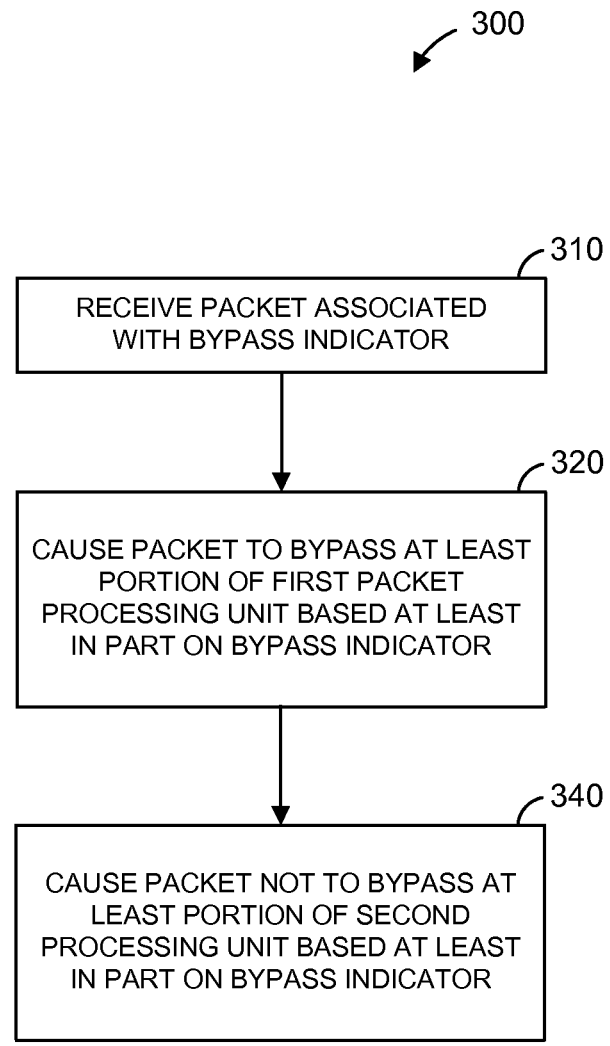
FIG. 6 is a flow diagram of an example method for dynamically bypassing at least a portion of a packet processing unit, according to an embodiment.

FIG. 6 is a flow diagram of an example method 300 for dynamically bypassing at least a portion of a packet processing unit, according to an embodiment. The method 300 is implemented within one or more network devices. Specifically, in some embodiments, the method 300 is implemented by the first packet processing unit 20A, the first bypass status determination unit 16A, and/or the first bypass unit 18A of FIG. 1. In other embodiments, the method 300 is implemented by a packet processing unit in the example switch device 100 of FIG. 2 (e.g., the router unit 132) and/or a corresponding BU 142 (e.g., the BU 142-2). In still other embodiments, the method 300 is implemented by the packet processing unit 180 and/or the bypass merging unit 182 of FIG. 3. In some embodiments, the method 300 is repeated for each received packet. In some embodiments, the method 300 is implemented with respect to only a portion of the processing within a packet processing unit. For example, the method 300 is implemented by the first portion 210A and/or first bypass merging unit 212A of FIG. 4, in an embodiment.

At block 310, a packet associated with a bypass indicator is received at the one or more network devices implementing the method 300. In some embodiments, the bypass indicator is information that is included in one or more data fields of the received packet (e.g., within the packet header). In other embodiments, the bypass indicator is information (e.g., a field of a packet descriptor associated with the received packet) generated by an earlier unit in a pipeline. In some embodiments, the packet is received from a previous packet processing unit or from a previous portion of a packet processing unit. For example, in one embodiment where the method 300 is implemented by the packet processing unit 20B, bypass status determination unit 16B, and/or bypass unit 18B of FIG. 1, the packet is received from the first packet processing unit 20A. As another example, in one embodiment where the method 300 is implemented by the first packet processing unit 20A, bypass status determination unit 16A, and/or bypass unit 18A of FIG. 1, the packet is received from the bypass indicator generator unit 14. As yet another example, in one embodiment where the method 300 is implemented by a packet processing unit in the example switch device 100 of FIG. 2 (and/or by a corresponding BU 144), the packet is received from a preceding packet processing unit in the pipeline 102 of the switch device 100. In other embodiments, the packet is instead received from a bypass merging unit that is associated with a packet processing unit (or portion of a packet processing unit) that precedes a packet processing unit (or portion of a packet processing unit) that implements the method 300. For example, in one embodiment, the packet is received from a previous bypass merging unit similar to the bypass merging unit 182 (e.g., from an arbitrator similar to the arbitrator 190).

At block 320, the packet received at block 310 is caused to bypass at least a portion of a first packet processing unit among a plurality of processing units based at least in part on the bypass indicator associated with the packet. As explained above, the term "packet" may refer herein to the entire packet, a portion of the packet, or a packet descriptor associated with the packet. In an embodiment, the packet is caused to bypass the first packet processing unit (or only a portion thereof) by being provided to a path parallel to the first packet processing unit (or portion thereof). For instance, the packet is caused to bypass the first packet processing unit (or portion thereof) by being provided to a parallel path that includes a buffer (e.g., a FIFO buffer). In some embodiments, the packet is caused to bypass an external access of the first packet processing unit (e.g., an access of one or more external memories, and/or an access of one or more external processing engines). In one embodiment, the block 320 is performed by a bypass unit similar to the first bypass unit 18A of FIG. 1. In another embodiment, the block 320 is performed by a bypass unit that is, or is a part of, an access stage similar to the access stage 184 of FIG. 3.

At block 340, the packet received at block 310 is caused not to bypass at least a portion of a second packet processing unit among the plurality of processing units based at least in part on the bypass indicator associated with the packet. In one embodiment, the second packet processing unit is adjacent to (i.e., immediately follows or immediately precedes) the first packet processing unit in a processing pipeline. In another embodiment, however, the second packet processing unit is separated from the first packet processing unit by one or more intermediate processing units in the pipeline. In an embodiment, the packet is caused not to bypass the second packet processing unit (or only a portion thereof) by being provided to the second packet processing unit (or portion thereof). In some embodiments, the packet is caused not to bypass an external access of the second packet processing unit (e.g., an access of one or more external memories, and/or an access of one or more external processing engines). In one embodiment, the block 340 is performed by a bypass unit similar to the second bypass unit 18B of FIG. 1. In another embodiment, the block 340 is performed by a bypass unit that is, or is a part of, an access stage similar to the access stage 184 of FIG. 3.

In other embodiments, the example method 300 includes one or more additional steps. For example, the method 300 further includes, before block 310, identifying a flow with which the packet received at block 310 is associated, and assigning the bypass indicator with which the packet is thereafter associated based at least in part on an identification of the flow, in an embodiment. Assigning the bypass indicator includes generating one or more fields of a packet descriptor associated with the packet, in an embodiment. As another example, the method 300 includes a step after each of blocks 320 and 340 wherein the bypass and non-bypass packet streams are merged, in an embodiment.

In some embodiments, the block 320 includes determining a first bypass status based on the bypass indicator associated with the packet received at block 310 (e.g., implemented by the first bypass status determination unit 16A of FIG. 1), and the block 340 includes determining a second bypass status based on the bypass indicator associated with the packet received at block 310 (e.g., implemented by the second bypass status determination unit 16B of FIG. 1).

In an embodiment, blocks 310, 320, and 340 of the example method 300 are repeated for a second received packet associated with a second bypass indicator different than the first bypass indicator. In some scenarios, for example, the second received packet is caused not to bypass the first packet processing unit, and/or to bypass the second packet processing unit, based at least in part on the second bypass indicator.

Figure 7:
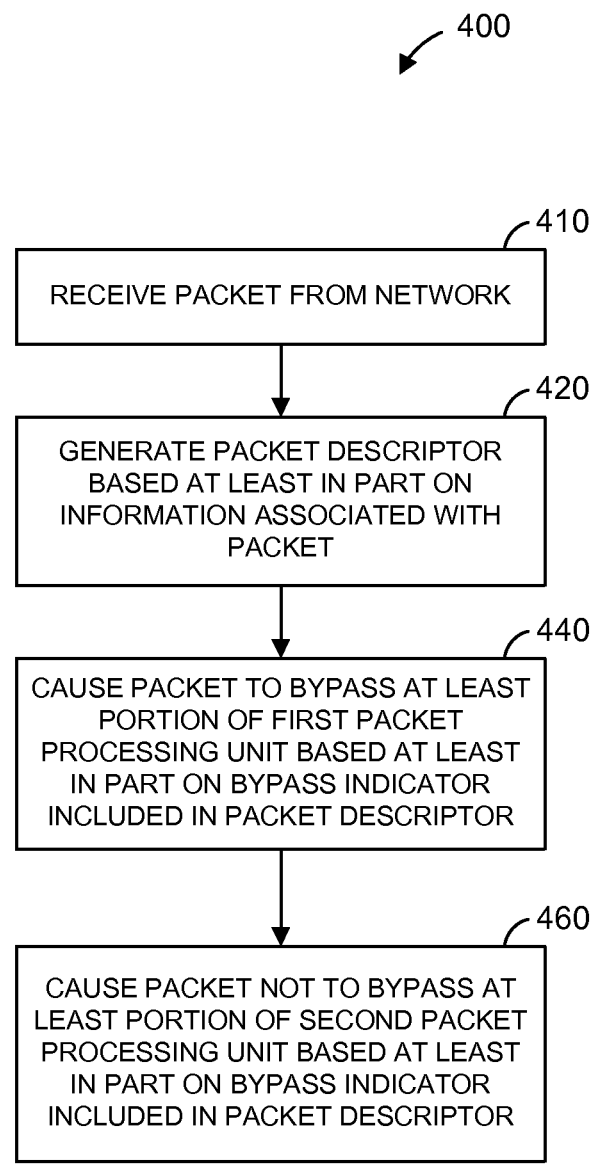
FIG. 7 is a flow diagram of another example method for dynamically bypassing at least a portion of a packet processing unit, according to an embodiment.

FIG. 7 is a flow diagram of another example method 400 for dynamically bypassing at least a portion of a packet processing unit, according to an embodiment. The method 400 is implemented within one or more network devices. Specifically, in some embodiments, the method 400 is implemented by the system 10 of FIG. 1, in an embodiment. In other embodiments, the method 400 is implemented by the example switch device 100 of FIG. 2. In some embodiments, however, the method 400 is implemented by a system different than the example system 10, or by one or more network devices different than the switch device 100. For example, the method 400 is implemented by a network bridge device, in an embodiment. In some embodiments, the method 400 is repeated for each packet received by a network device that implements the method 400.

At block 410, a packet is received from a network. In some embodiments, the packet is received from a WAN or a LAN (e.g., a wireless LAN). In an embodiment, the packet is received from the network via a network interface such as the network interface 120 of FIG. 2, for example. In some embodiments, the packet is received via a packet ingress of the network device such as the ingress pipeline 104 of FIG. 2 (e.g., via the network interface 120).

At block 420, a packet descriptor is generated based at least in part on information associated with the packet received at block 410 (e.g., based on packet header information, external information such as source or destination port, etc.). The generated packet descriptor includes a bypass indicator (e.g., in one or more fields of the packet descriptor). In an embodiment, the bypass indicator is assigned or determined based on an identified flow associated with the packet received at block 410. In some embodiments, the bypass indicator is assigned or determined at least in part by accessing a memory (e.g., performing a multi-field lookup in a TCAM or accessing a lookup table stored in another suitable memory) that relates each of a plurality of flow classifications to one or more of a plurality of bypass indicators. The packet descriptor (including the bypass indicator) is generated by modifying the value of data in a particular data field of an existing packet descriptor, by adding a new data field to an existing packet descriptor, or by generating a new packet descriptor, according to various embodiments.

At block 440, the packet received at block 410 is caused to bypass at least a portion of a first packet processing unit based at least in part on the bypass indicator included in the packet descriptor generated at block 420. As explained above, the term "packet" may refer herein to the entire packet, a portion of the packet, or a packet descriptor associated with the packet. In an embodiment, the packet is caused to bypass the first packet processing unit (or portion thereof) by being provided to a path parallel to the first packet processing unit (or portion thereof). For instance, the packet is caused to bypass the first packet processing unit (or portion thereof) by being provided to a parallel path that includes a buffer (e.g., a FIFO buffer). In one embodiment, the block 440 is performed by a bypass unit similar to the first bypass unit 18A of FIG. 1. In another embodiment, the block 440 is performed by a bypass unit that is, or is a part of, an access stage similar to the access stage 184 of FIG. 3.

At block 460, the packet received at block 410 is caused not to bypass at least a portion of a second packet processing unit based at least in part on the bypass indicator included in the packet descriptor generated at block 420. In one embodiment, the second packet processing unit is adjacent to (i.e., immediately follows or immediately precedes) the first packet processing unit in a processing pipeline. In another embodiment, however, the second packet processing unit is separated from the first packet processing unit by one or more intermediate processing units in the pipeline. In an embodiment, the packet is caused not to bypass the second packet processing unit (or portion thereof) by being provided to the second processing unit (or portion thereof). In one embodiment, the block 460 is performed by a bypass unit similar to the second bypass unit 18B of FIG. 1. In another embodiment, the block 460 is performed by a bypass unit that is, or is a part of, an access stage similar to the access stage 184 of FIG. 3.

In an embodiment, blocks 410, 420, 440, and 460 of the example method 400 are repeated for a second received packet. In some scenarios, for example, the second received packet is caused not to bypass the first packet processing unit, and/or to bypass the second packet processing unit, based at least in part on a second bypass indicator included in a second generated packet descriptor associated with the second received packet.

In some embodiments, the example method 400 includes one or more additional steps. For example, in one embodiment, the method 400 further includes identifying a flow with which the packet received at block 410 is associated, where the bypass indicator included in the packet descriptor generated at block 420 is generated based at least in part on an identified flow. As another example, in an embodiment, the method 400 further includes a step between blocks 420 and block 440 wherein a first bypass status is determined based on the bypass indicator in the generated packet descriptor, and another step between blocks 440 and block 460 wherein a second bypass status is determined based on the bypass indicator in the generated packet descriptor. As yet another example, the method 400 includes a step after block 460 wherein the packet is merged with another packet stream, in an embodiment.

In some embodiments, at least portions of the dynamic bypass techniques described above are implemented in hardware or firmware. For example, the packet processing unit 180 and/or bypass merging unit 182 of FIG. 3 are, in whole or in part, implemented by hardware or firmware, in an embodiment. In some of these embodiments, the blocks, operations, techniques, etc., are implemented in, for example, a custom integrated circuit (IC), an application specific integrated circuit (ASIC), a programmable logic device (PLD), a field programmable logic array (FPGA), a programmable logic array (PLA), etc.

Embodiments of the present disclosure may be embodied in any type of router or other network device used in a wired or wireless communication system including, for example, devices used in communication systems including or coupled to a wired or wireless LAN or a wired or wireless WAN, Internet, cable and satellite based communication systems (such as Internet, data, video and voice communication systems), wireless telephone systems (including cellular phone systems, voice over internet protocol (VoIP) systems, home-based wireless telephone systems), etc.

While the present invention has been described with reference to specific examples, which are intended to be illustrative only and not to be limiting of the invention, it will be apparent to those of ordinary skill in the art that changes, additions and/or deletions may be made to the disclosed embodiments without departing from the spirit and scope of the invention.

What is claimed is:

1. A method for processing packets in a network device, the method comprising:
receiving a first packet at the network device, the first packet being associated with a first bypass indicator that indicates i) a first bypass status for a first packet processing unit among a plurality of packet processing units of the network device, the plurality of packet processing units arranged in a serial processing pipeline configured to process packets received by the network device, respective ones of the packet processing units being configured to perform corresponding packet processing operations and ii) a second bypass status for a second packet processing unit among the plurality of packet processing units in the serial processing pipeline that is configured to process packets received by the network device, the second packet processing unit being disposed after the first packet processing unit in the serial processing pipeline;
based at least in part on analyzing a value of the first bypass indicator for the first packet processing unit, causing a first packet descriptor associated with the first packet i) to be routed around at least a portion of the first packet processing unit so that the first packet descriptor entirely skips being processed by the at least the portion of the first packet processing unit and ii) to subsequently be merged with packet descriptors that did not skip being processed by the at least the portion of the first packet processing unit;
based at least in part on analyzing the value of the first bypass indicator for the second packet processing unit, causing the first packet descriptor i) to be provided to at least a portion of the second packet processing unit so that the first packet descriptor does not skip being processed by the at least the portion of the second packet processing unit and ii) to subsequently be merged with packet descriptors that skipped being processed by the at least the portion of the second packet processing unit;
receiving a second packet at the network device, the second packet being associated with a second bypass indicator different than the first bypass indicator; and
based at least in part on analyzing a value of the second bypass indicator for the first packet processing unit, causing a second packet descriptor associated with the second packet to be provided to at least the portion of the first packet processing unit so that the second packet descriptor does not skip being processed by the at least the portion of the first packet processing unit.

2. A method according to claim 1, wherein causing the first packet descriptor to be routed around at least the portion of the first packet processing unit includes causing the first packet descriptor to skip being processed by the portion, but not an entirety, of the first packet processing unit.

3. A method according to claim 1, wherein:
the first packet processing unit includes an external access of at least one of i) one or more external memories and ii) one or more external processing engines, and
causing the first packet descriptor to be routed around at least the portion of the first packet processing unit includes causing the first packet descriptor to be routed around at least the external access.

4. A method according to claim 1, wherein causing the first packet descriptor to be routed around at least the portion of the first packet processing unit includes providing the first packet descriptor to a buffer in parallel with at least the portion of the first packet processing unit.

5. A method according to claim 1, further comprising:
identifying a first flow with which the first packet is associated based on a multi-field lookup of packet attributes, and
assigning the first bypass indicator based at least in part on an identification of the first flow.

6. A method according to claim 5, wherein assigning the first bypass indicator includes generating one or more fields of the first packet descriptor.

7. A method according to claim 1, wherein:
causing the first packet descriptor to be routed around at least the portion of the first packet processing unit includes determining the first bypass status based on the first bypass indicator, and
causing the first packet descriptor to be provided to at least the portion of the second packet processing unit includes determining the second bypass status based on the first bypass indicator.

8. A network device comprising:
a network interface configured to receive packets transmitted on a network;
a plurality of packet processing units arranged in a serial processing pipeline configured to process packets received by the network device, respective ones of the packet processing units being configured to perform corresponding packet processing operations on received packets and to provide packet descriptors associated with packets to a next packet processing unit in the processing pipeline that is configured to process packets received by the network device;
a first bypass unit configured to
based at least in part on analyzing a value of a first bypass indicator associated with a first packet, the first bypass indicator indicating i) a first bypass status for a first packet processing unit among the plurality of packet processing units and ii) a second bypass status for a second packet processing unit among the plurality of packet processing units, cause a first packet descriptor associated with the first packet i) to be routed around at least a portion of the first packet processing unit so that the first packet descriptor entirely skips being processed by the at least the portion of the first packet processing unit and ii) to subsequently be merged with packet descriptors that did not skip being processed by the at least the portion of the first packet processing unit, and
based at least in part on analyzing a value of a second bypass indicator associated with a second packet, the second bypass indicator being different than the first bypass indicator associated with the first packet, cause a second packet descriptor associated with the second packet to be provided to at least the portion of the first packet processing unit so that the second packet descriptor does not skip being processed by the at least the portion of the first packet processing unit; and
a second bypass unit configured to, based at least in part on analyzing the value of the first bypass indicator associated with the first packet, cause the first packet descriptor i) to be provided to at least a portion of the second packet processing unit so that the first packet descriptor does not skip being processed by the at least the portion of the second packet processing unit and ii) to subsequently be merged with packet descriptors that skipped being processed by the at least the portion of the second packet processing unit;
  wherein the plurality of packet processing units, the first bypass unit and the second bypass unit are implemented on one or more integrated circuit devices.
9. A network device according to claim 8, further comprising:
  a flow identification unit configured to
    identify a flow with which the first packet is associated based on a multi-field lookup of packet attributes, and
    assign the first bypass indicator corresponding to an identified flow.
10. A network device according to claim 9, wherein:
  the first bypass unit includes a first bypass status determination unit, the first bypass status determination unit being configured to determine the first bypass status, and
  the second bypass unit includes a second bypass status determination unit, the second bypass status determination unit being configured to determine the second bypass status.
11. A network device according to claim 8, further comprising:
  a first buffer associated with the first packet processing unit for storing packets routed around the first packet processing unit; and
  a second buffer associated with the second packet processing unit for storing packets routed around the second packet processing unit.
12. A network device according to claim 8, wherein:
  the first bypass unit is configured to cause or not cause the first packet descriptor to be routed around the portion, but not an entirety, of the first packet processing unit.
13. A network device according to claim 8, wherein:
  the first packet processing unit includes an external access of at least one of i) one or more external memories and ii) one or more external processing engines, and
  the first bypass unit is configured to cause or not cause the first packet descriptor to be routed around at least the external access.
14. A network device according to claim 8, further comprising:
  a first arbitrator configured to merge packet descriptors processed by the first packet processing unit with packet descriptors that skip being processed by the first packet processing unit; and
  a second arbitrator configured to merge packet descriptors processed by the second packet processing unit with packets that skip being processed by the second packet processing unit.
15. A method for processing packets in a network device, the method comprising:
  receiving a first packet from a network;
  generating a first packet descriptor based at least in part on information associated with the first packet, wherein the first packet descriptor includes a first bypass indicator that indicates i) a first bypass status for a first packet processing unit among a plurality of packet processing units of the network device, the plurality of packet processing units arranged in a serial processing pipeline configured to process packets received by the network device, respective ones of the packet processing units being configured to perform corresponding packet processing operations and ii) a second bypass status for a second packet processing unit among the plurality of packet processing units in the serial processing pipeline that is configured to process packets received by the network device, the second packet processing unit being disposed after the first packet processing unit in the serial processing pipeline;
  based at least in part on analyzing the first bypass indicator for the first packet processing unit, causing a first packet descriptor associated with the first packet i) to be routed around at least a portion of the first packet processing unit so that the first packet descriptor entirely skips being processed by the at least the portion of the first packet processing unit and ii) to subsequently be merged with packet descriptors that did not skip being processed by the at least the portion of the first packet processing unit; and
  based at least in part on analyzing the value of the first bypass indicator for the second packet processing unit, causing the first-packet descriptor i) to be provided to at least a portion of the second packet processing unit so that the first packet descriptor does not skip being processed by the at least the portion of the second packet processing unit and ii) to subsequently be merged with packet descriptors that skipped being processed by the at least the portion of the second packet processing unit;
  receiving a second packet from the network;
  generating a second packet descriptor based at least in part on information associated with the second packet, wherein the second packet descriptor includes a second bypass indicator different than the first bypass indicator; and
  based at least in part on analyzing a value of the second bypass indicator for the first packet processing unit, causing the second packet descriptor to be provided to at least the portion of the first packet processing unit so that the second packet descriptor does not skip being processed by the at least the portion of the first packet processing unit.
16. A method according to claim 15, further comprising:
  identifying a first flow with which the first packet is associated; and
  wherein generating a first packet descriptor includes generating the first bypass indicator based at least in part on the first flow.
17. A network device comprising:
  a network interface configured to receive packets from a network;
  a first packet processing unit among a plurality of packet processing units, the plurality of packet processing units arranged in a serial processing pipeline configured to process packets received by the network device, the first packet processing unit configured to perform a first packet processing operation on received packets;
  a second packet processing unit among the plurality of packet processing units, the second packet processing unit configured to perform a second packet processing operation on the received packets, wherein the second packet processing unit is disposed after the first packet processing unit in the serial processing pipeline;
  a descriptor generator unit configured to
    i) generate a first packet descriptor based at least in part on information associated with a first packet of the received packets, wherein the first packet descriptor includes a first bypass indicator that indicates i) a first bypass status and ii) a second bypass status, and ii) generate a second packet descriptor based at least in part on information associated with a second packet of the received packets, wherein the second packet descriptor includes a second bypass indicator different than the first bypass indicator;

a first bypass unit configured to based at least in part on analyzing a value of the first bypass indicator included in the first packet descriptor, cause the first packet descriptor i) to be routed around at least a portion of the first packet processing unit so that the packet descriptor entirely skips being processed by the at least the portion of the first packet processing unit and ii) to subsequently be merged with packet descriptors that did not skip being processed by the at least the portion of the first packet processing unit, and based at least in part on analyzing a value of the second bypass indicator included in the second packet descriptor, cause the second packet descriptor to be provided to at least the portion of the first packet processing unit so that the second packet descriptor does not skip being processed by the at least the portion of the first packet processing unit; and a second bypass unit configured to, based at least in part on analyzing the value of the first bypass indicator included in the first packet descriptor, cause the first packet descriptor i) to be provided to at least a portion of the second packet processing unit so that the first packet descriptor does not skip being processed by the at least the portion of the second packet processing unit and ii) to subsequently be merged with packet descriptors that skipped being processed by the at least the portion of the second packet processing unit;

wherein the first packet processing unit, the second packet processing unit, the first bypass unit, and the second bypass unit are implemented on one or more integrated circuit devices.

18. A network device according to claim 17, further comprising:

a flow identification unit configured to identify flows with which the received packets are associated based on a multi-field lookup of packet attributes; and wherein the descriptor generator unit is configured to generate the first packet descriptor at least in part by generating the first bypass indicator based on an identified flow associated with the first packet.

* * * * *